United States Patent
Laaksonen et al.

(10) Patent No.: US 10,445,912 B2
(45) Date of Patent: Oct. 15, 2019

(54) GEOGRAPHICAL LOCATION VISUAL INFORMATION OVERLAY

(71) Applicant: Nokia Technologies Oy, Espoo (FI)

(72) Inventors: Lasse Laaksonen, Tampere (FI); Arto Lehtiniemi, Lempaala (FI); Mikko Tammi, Tampere (FI); Miikka Vilermo, Siuro (FI)

(73) Assignees: Nokia Technologies Oy, Espoo (FI); Fischerwerke GMBH & Co. KG, Waldachtal (DE)

( * ) Notice: Subject to any disclaimer, the term of this patent is extended or adjusted under 35 U.S.C. 154(b) by 0 days.

(21) Appl. No.: 15/738,902

(22) PCT Filed: Jun. 28, 2016

(86) PCT No.: PCT/FI2016/050473
§ 371 (c)(1),
(2) Date: Dec. 21, 2017

(87) PCT Pub. No.: WO2017/001729
PCT Pub. Date: Jan. 5, 2017

(65) Prior Publication Data
US 2018/0182146 A1 Jun. 28, 2018

(30) Foreign Application Priority Data
Jul. 2, 2015 (EP) .................................... 15174926

(51) Int. Cl.
*G06T 11/60* (2006.01)
*G06T 13/80* (2011.01)
*H04N 1/00* (2006.01)
*H04N 1/32* (2006.01)
(Continued)

(52) U.S. Cl.
CPC ............ *G06T 11/60* (2013.01); *G06F 3/1454* (2013.01); *G06T 3/20* (2013.01); *G06T 13/80* (2013.01); *H04N 1/00169* (2013.01); *H04N 1/00204* (2013.01); *H04N 1/00307* (2013.01); *H04N 1/32144* (2013.01); *H04N 1/32203* (2013.01); *H04N 1/32309* (2013.01)

(58) Field of Classification Search
None
See application file for complete search history.

(56) References Cited

U.S. PATENT DOCUMENTS

| 6,307,556 | B1* | 10/2001 | Ellenby | .................. | G01C 17/34 345/427 |
| 2007/0027591 | A1* | 2/2007 | Goldenberg | ........ | G06F 17/3087 701/23 |
| 2008/0244648 | A1 | 10/2008 | Arfvidsson et al. | ............ | 725/38 |

(Continued)

*Primary Examiner* — Yanna Wu
(74) *Attorney, Agent, or Firm* — Harrington & Smith

(57) ABSTRACT

A method including causing display of a first visual information that is a view from a first geographical location, receiving, by the apparatus, an indication of availability of a second visual information that is a view from a second geographical location, the second geographical location being in a first direction from the first geographical location, determining a position in the first visual information that corresponds with the first direction, and causing display of at least a portion of the second visual information such that the portion of the second visual information overlays the first visual information at the position in the first visual information is disclosed.

19 Claims, 10 Drawing Sheets

(51) Int. Cl.
*G06F 3/14* (2006.01)
*G06T 3/20* (2006.01)

(56) References Cited

U.S. PATENT DOCUMENTS

| | | | |
|---|---|---|---|
| 2010/0029293 A1* | 2/2010 | Bergh | G01C 21/3647 |
| | | | 455/456.1 |
| 2010/0215250 A1* | 8/2010 | Zhu | G06T 17/05 |
| | | | 382/154 |
| 2013/0235028 A1 | 9/2013 | Giencke et al. | 345/419 |
| 2013/0297206 A1* | 11/2013 | Heng | G01C 21/3682 |
| | | | 701/532 |
| 2014/0347387 A1* | 11/2014 | Kritt | H04N 5/265 |
| | | | 345/629 |
| 2018/0164588 A1* | 6/2018 | Leppanen | G06F 3/012 |

\* cited by examiner

GEOGRAPHICAL LOCATION VISUAL INFORMATION OVERLAY

TECHNICAL FIELD

The present application relates generally to overlaying visual information that is a view from a geographical location.

BACKGROUND

As electronic apparatuses become more pervasive, many users are increasingly using such apparatuses for purposes relating to navigation, exploration of visual information associated with geographical locations, and/or the like. As such, it may be desirable to configure an electronic apparatus such that the electronic apparatus allows a user to explore such visual information associated with geographical locations in an easy and intuitive manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for causing display of a first visual information that is a view from a first geographical location, receiving, by the apparatus, an indication of availability of a second visual information that is a view from a second geographical location, the second geographical location being in a first direction from the first geographical location, determining a position in the first visual information that corresponds with the first direction, and causing display of at least a portion of the second visual information such that the portion of the second visual information overlays the first visual information at the position in the first visual information.

One or more example embodiments may provide an apparatus, a computer readable medium, a computer program product, and/or a non-transitory computer readable medium having means for causing display of a first visual information that is a view from a first geographical location, means for receiving, by the apparatus, an indication of availability of a second visual information that is a view from a second geographical location, the second geographical location being in a first direction from the first geographical location, means for determining a position in the first visual information that corresponds with the first direction, and means for causing display of at least a portion of the second visual information such that the portion of the second visual information overlays the first visual information at the position in the first visual information.

An apparatus comprising at least one processor and at least one memory, the memory comprising machine-readable instructions, that when executed cause the apparatus to perform causation of display of a first visual information that is a view from a first geographical location, receipt of, by the apparatus, an indication of availability of a second visual information that is a view from a second geographical location, the second geographical location being in a first direction from the first geographical location, determination of a position in the first visual information that corresponds with the first direction, and causation of display of at least a portion of the second visual information such that the portion of the second visual information overlays the first visual information at the position in the first visual information.

One or more example embodiments further perform cause establishment of a view sharing session between the apparatus and a separate apparatus.

In at least one example embodiment, wherein the indication of availability of the second visual information is received from the separate apparatus based, at least in part, on the view sharing session.

In at least one example embodiment, the apparatus is a user apparatus, and the separate apparatus is another user apparatus.

One or more example embodiments further perform receive an indication of an emphasis request from the separate apparatus, and cause display of an emphasis indicator that comprises visual information that is configured to emphasize the position in the first visual information in response to the emphasis request.

In at least one example embodiment, the emphasis request is a request to cause visual emphasis of the portion of the second visual information.

One or more example embodiments further perform send an indication of availability of the first visual information to the separate apparatus based, at least in part, on the view sharing session.

One or more example embodiments further perform receive a visual information sharing input that indicates a desire to cause the sending of the indication of availability of the first visual information to the separate apparatus.

In at least one example embodiment, the sending of the indication of availability of the first visual information to the separate apparatus is based, at least in part, on the visual information sharing input.

One or more example embodiments further perform send an indication of an emphasis request to the separate apparatus, the emphasis request being a request to cause visual emphasis of a portion of the first visual information.

One or more example embodiments further perform receive a visual information emphasis input that indicates a desire to cause the sending of the indication of the emphasis request to the separate apparatus.

In at least one example embodiment, the sending of the indication of the emphasis request to the separate apparatus is based, at least in part, on the visual information emphasis input.

In at least one example embodiment, the display of the first visual information is performed such that a portion, which is less than an entirety, of the first visual information is displayed.

One or more example embodiments further perform send a portion designation that identifies the portion of the first visual information to the separate apparatus.

In at least one example embodiment, the display of the first visual information is performed such that a portion, which is less than an entirety, of the first visual information is displayed.

One or more example embodiments further perform determine that the first direction fails to correspond with any position in the portion of the first visual information, cause display of a view availability direction indicator that indicates a direction towards the position in the first visual information, and cause panning of the portion of the first visual information such that the position in the first visual information becomes included in the portion of the first visual information.

In at least one example embodiment, the causation of the panning of the portion of the first visual information is performed absent receipt of user input that indicates a desire to cause the panning of the portion of the first visual information.

One or more example embodiments further perform receipt of a panning input that indicates a desire to cause panning of the portion of the first visual information.

In at least one example embodiment, the causation of the panning of the portion of the first visual information is performed in response to the panning input.

In at least one example embodiment, the view availability direction indicator comprises visual information that indicates the direction towards the position in the first visual information.

In at least one example embodiment, the view availability direction indicator is the portion of the second visual information, the view availability direction indicator is caused to be displayed at a central position in the first visual information.

One or more example embodiments further perform cause movement of the view availability direction indicator from the central position in the first visual information to the position in the first visual information.

One or more example embodiments further perform receive a selection input that indicates selection of the portion of the second visual information, and cause display of the second visual information based, at least in part, on the selection input.

One or more example embodiments further perform cause termination of display of the first visual information based, at least in part, on the selection input.

One or more example embodiments further perform cause termination of display of the first visual information based, at least in part, on the display of the second visual information.

In at least one example embodiment, the causation of display of the second visual information comprises causation of display of a transition animation that transitions from display of the first visual information to display of the second visual information based, at least in part, on the selection input.

One or more example embodiments further perform determine availability of a third visual information that is a view from a third geographical location, the third geographical location being intermediate to the first geographical location and the second geographical location.

In at least one example embodiment, the transition animation transitions from the display of the first visual information to display of the third visual information and display of the third visual information to display of the second visual information.

One or more example embodiments further perform receive a portion designation that identifies the portion of the second visual information.

In at least one example embodiment, the portion of the second visual information is based, at least in part, on the portion designation.

One or more example embodiments further perform render first audio information that corresponds with the first visual information based, at least in part, on the display of the first visual information.

One or more example embodiments further perform render second audio information that corresponds with the second visual information contemporaneously with the rendering of the first audio information based, at least in part, on the display of the portion of the second visual information.

In at least one example embodiment, the first visual information is visual information that is received from a first camera module located at the first geographical location.

In at least one example embodiment, the second visual information is visual information that is received from a second camera module located at the second geographical location.

In at least one example embodiment, the third visual information is visual information that is received from a third camera module located at the third geographical location.

BRIEF DESCRIPTION OF THE DRAWINGS

For a more complete understanding of one or more example embodiments, reference is now made to the following descriptions taken in connection with the accompanying drawings in which.

DETAILED DESCRIPTION OF THE DRAWINGS

Figure 1:
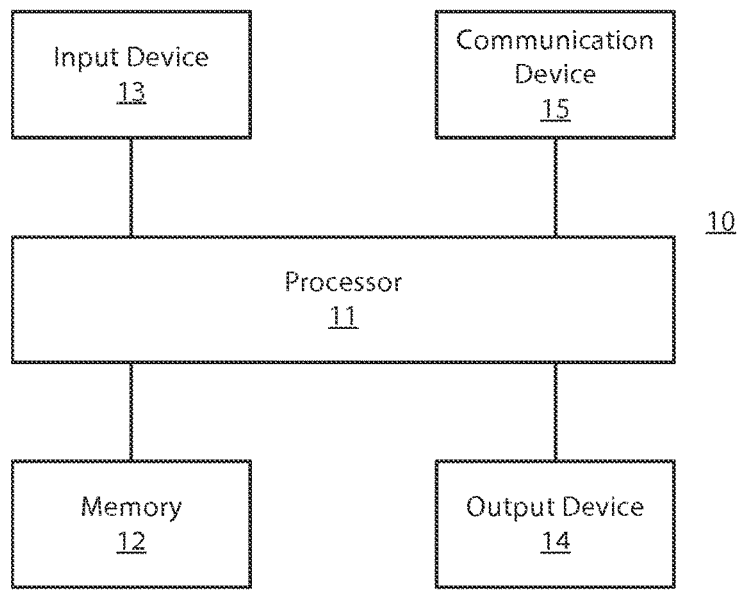
FIG. 1 is a block diagram showing an apparatus according to at least one example embodiment.

Various example embodiments and some of their potential advantages are understood by referring to FIGS. 1 through 9 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a head mounted display, a near eye display, a see-through display, a wearable apparatus, an augmented reality apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

One or more example embodiments may include a geographic database. For example, the geographic database may comprise map information associated the example of FIG. 4A, visual information that is a view from a geographical location associated with the examples of FIGS. 4B-4D and FIGS. 5A-5D, and/or the like. For example, the geographic database may include node data records, road segment or link data records, point of interest (POI) data records, perspective image data records, video content data records, and other data records. More, fewer or different data records may be provided. In at least one example embodiment, the other data records include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or GPS data associations (such as using known or future map matching or geo-coding techniques), for example.

In at least one example embodiment, the road segment data records are links or segments representing roads, streets, or paths, as may be used in the calculated route or recorded route information for determination of one or more personalized routes. The node data records may be end points corresponding to the respective links or segments of the road segment data records. The road link data records and the node data records may represent a road network, such as used by vehicles, cars, and/or other entities. Alternatively, the geographic database may contain path segment and node data records or other data that represent pedestrian paths or areas in addition to or instead of the vehicle road record data, for example.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the geographic database may include and/or be associated with event data (e.g., traffic incidents, constructions, scheduled events, unscheduled events, etc.) associated with the POI data records or other records of the geographic database.

The geographic database may be maintained by a content provider (e.g., a map developer) in association with a services platform. By way of example, the map developer may collect geographic data to generate and enhance the geographic database. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used.

The geographic database may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation apparatuses or systems.

Geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation apparatus, such as by an end user apparatus, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation apparatus developer or other end user apparatus developer, may perform compilation on a received geographic database in a delivery format to produce one or more compiled navigation databases.

As mentioned above, a server side geographic database may be a master geographic database, but in alternate embodiments, a client side geographic database may represent a compiled navigation database that may be used in or with an end user apparatus to provide navigation and/or map-related functions. For example, the geographic database may be used with an end user apparatus to provide an end user with navigation features. In such an example, the geographic database may be downloaded or stored on the end user apparatus, such as in one or more applications, or the end user apparatus may access the geographic database through a wireless or wired connection (such as via a server and/or a communication network), for example.

In at least one example embodiment, the end user apparatus is one of an in-vehicle navigation system, a personal navigation device (PND)/personal navigation apparatus, a portable navigation device/portable navigation apparatus, a cellular telephone, a mobile phone, a personal digital assistant (PDA), a watch, a camera, a computer, and/or other apparatuses that may perform navigation-related functions, such as digital routing and map display. In at least one example embodiment, the navigation apparatus is a cellular telephone. An end user may use the end user apparatus for navigation and map functions such as guidance and map display, for example, and for determination of one or more personalized routes or route segments based, at least in part, on one or more calculated and recorded routes, according to exemplary embodiments.

Figure 2A:
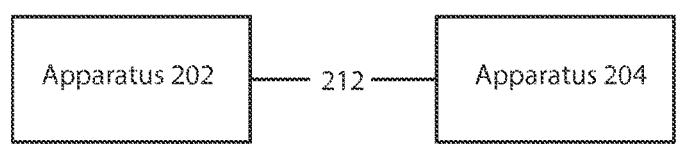
FIGS. 2A-2B are diagrams illustrating apparatus communication according to at least one example embodiment.
Figure 2B:
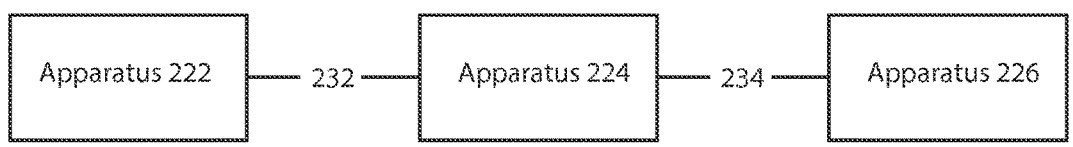

FIGS. 2A-2B are diagrams illustrating apparatus communication according to at least one example embodiment. The example of FIGS. 2A-2B are merely examples and do not limit the scope of the claims. For example, apparatus count may vary, apparatus configuration may vary, communication channels may vary, and/or the like.

In the example of FIG. 2A, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2A illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus, based, at least in part, on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2A, apparatus 202 communicates with apparatus 204 by way of a communication channel 212. In the example of FIG. 2A, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2A, apparatus 202 communicates with apparatus 204 by way of communication channel 212. In the example of FIG. 2A, communication channel 212 may be a local area network communication channel, a wide area network communication channel, an internet communication channel, a cellular communication channel, and/or the like.

In the example of FIG. 2B, apparatus 222 communicates with apparatus 224 by way of communication channel 232. For example, apparatus 222 may send information to apparatus 224 by way of communication channel 232, apparatus 222 may receive information sent from apparatus 224 by way of communication channel 232, and/or the like. A communication channel, for example, may be a channel utilized for sending and/or receiving of information, data, communications, and/or the like, between two or more apparatuses. It should be understood that, even though the example of FIG. 2B illustrates a direct communication channel between apparatus 222 and apparatus 224, there may be intermediate apparatuses that facilitate communication between apparatus 222 and apparatus 224. For example, there may be one or more routers, hubs, switches, gateways, and/or the like, that are utilized in the communication channels between apparatus 222 and apparatus 224. In addition, there may be other separate apparatuses that apparatus 222 and/or apparatus 224 are in communication with. For example, apparatus 222 and/or apparatus 224 may be in communication with another apparatus, a separate apparatus, a different apparatus, and/or the like.

In the example of FIG. 2B, apparatus 226 communicates with apparatus 224 by way of communication channel 234. For example, apparatus 226 may send information to apparatus 224 by way of communication channel 234, apparatus 226 may receive information sent from apparatus 224 by way of communication channel 234, and/or the like. It should be understood that, even though the example of FIG. 2B illustrates a direct communication channel between apparatus 226 and apparatus 224, there may be intermediate apparatuses that facilitate communication between apparatus 226 and apparatus 224. For example, there may be one or more routers, hubs, switches, gateways, and/or the like, that are utilized in the communication channels between apparatus 226 and apparatus 224. In addition, there may be other separate apparatuses that apparatus 226 and/or apparatus 224 are in communication with. For example, apparatus 226 and/or apparatus 224 may be in communication with another apparatus, a separate apparatus, a different apparatus, and/or the like. In this manner, apparatus 222 may be in communication with apparatus 226 by way of apparatus 224. For example, apparatus 226 may send information to apparatus 224, and apparatus 224 may subsequently send the information to apparatus 222.

In some circumstances, a user may desire to have collaboration between apparatuses, such as between an apparatus and a separate apparatus, based, at least in part, on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2B, apparatus 222 communicates with apparatus 224 by way of a communication channel 232. In the example of FIG. 2B, communication channel 232 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. In another example, as depicted in FIG. 2B, apparatus 226 communicates with apparatus 224 by way of a communication channel 234. In the example of FIG. 2B, communication channel 234 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2B, apparatus 222 communicates with apparatus 224 by way of communication channel 232. In the example of FIG. 2B, communication channel 232 may be a local area network communication channel, a wide area network communication channel, an internet communication channel, a cellular communication channel, and/or the like. Similarly, as depicted in FIG. 2B, apparatus 226 communicates with apparatus 224 by way of communication channel 234. In the example of FIG. 2B, communication channel 234 may be a local area network communication channel, a wide area network communication channel, an internet communication channel, a cellular communication channel, and/or the like.

Figure 3A:
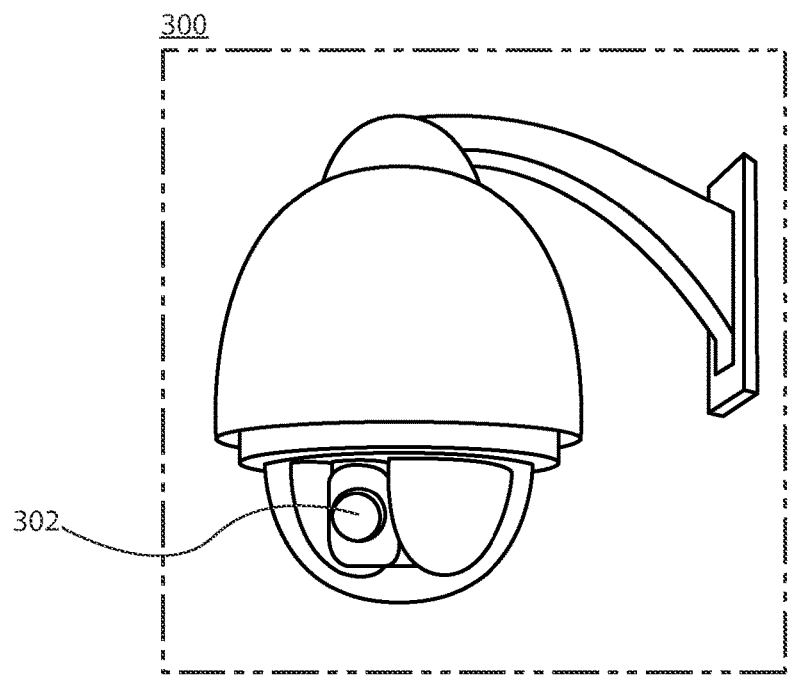
FIGS. 3A-3B are diagrams illustrating camera modules according to at least one example embodiment.
Figure 3B:
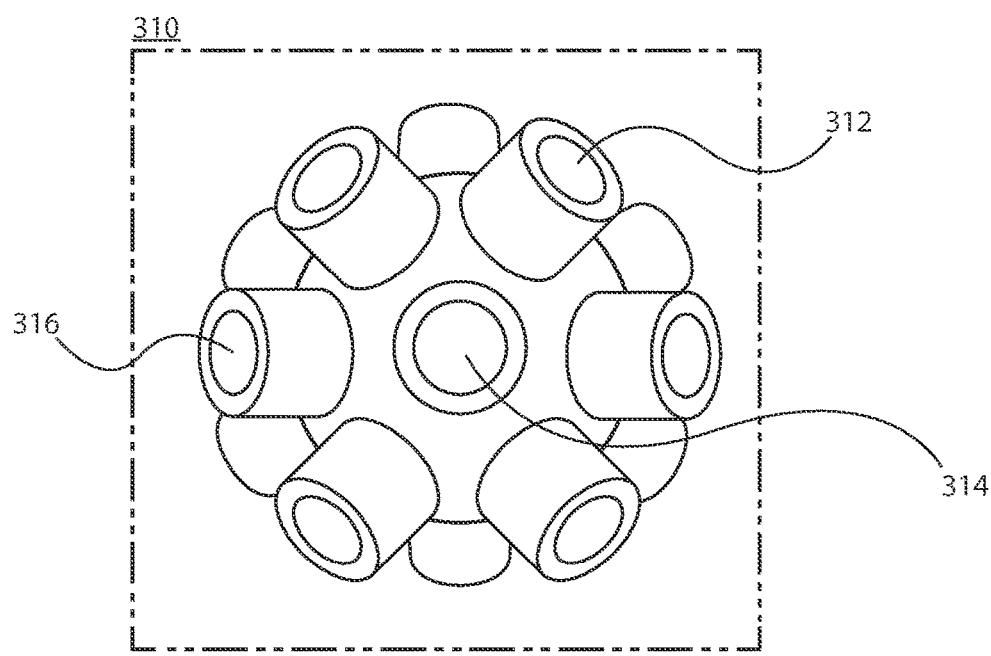

FIGS. 3A-3B are diagrams illustrating camera modules according to at least one example embodiment. The examples of FIGS. 3A-3B are merely examples and do not limit the scope of the claims. For example, camera module design may vary, camera module configuration may vary, and/or the like.

In some circumstances, it may be desirable to capture visual information that depicts a view from a geographical location. For example, users commonly explore geographical locations using an electronic apparatus by way of exploring street-level imagery, viewing video content that was captured at various geographical locations, and/or the like. As geographical databases, map information, and similar geographical-related repositories become increasingly inclusive and granular, it may be desirable to provide a user with an intuitive manner in which to browse such visual information, an easy manner in which to identify that visual information captured at a particular geographical location is available, and/or the like. Such visual information may be captured by a separate apparatus, such as an apparatus comprising one or more camera modules. The separate apparatus may be a user apparatus that was temporarily located at a geographical location and captured visual information from the geographical location, a video capture apparatus that is permanently fixed to an object at a geographical location and continuously streams visual information from the geographical location, and/or the like.

FIG. 3A is a diagram illustrating a camera module according to at least one example embodiment. The example of FIG. 3A depicts an apparatus that comprises camera module 302. As can be seen, the apparatus is configured to be attached to an object, such as a post, a wall, a vehicle, an aerial drone, an aircraft, and/or the like, and comprises a tilt-pan mechanism that allows movement of camera module 302. Camera module 302 may capture visual information within a field of view of camera module 302 such that the visual information depicts a portion of the environment surrounding the apparatus, depicts a single view from the geographical location at which the apparatus is located, and/or the like.

In recent times, panoramic visual information has become increasingly pervasive. Such panoramic visual information may depict a larger portion of an environment surrounding an apparatus in relation to non-panoramic visual information, provides a user with an ability to pan around the entirety of a scene captured by the apparatus, and/or the like.

FIG. 3B is a diagram illustrating a camera module according to at least one example embodiment. The example of FIG. 3B depicts an apparatus that comprises a plurality of camera modules, including camera modules 312, 314, and 316. As can be seen, the apparatus is configured to be attached to an object, such as a post, a wall, a vehicle, an aerial drone, an aircraft, etc., hang from an object, such as a light fixture, signal light, etc., and/or the like. As can be seen, each camera module of the plurality of camera modules is arranged such that the plurality of camera modules may capture visual information associated with a majority, an entirety, and/or the like of the environment surrounding the apparatus. For example, each of camera modules 312, 314, and 316 may capture visual information within a field of view of the respective camera module such that the aggregate visual information, together with the other camera modules, depicts a majority, an entirety, and/or the like of the environment surrounding the apparatus, depicts a plurality of views from the geographical location at which the apparatus is located, and/or the like.

FIGS. 4A-4D are diagrams illustrating visual information that is a view from a geographical location according to at least one example embodiment. The examples of FIGS. 4A-4D are merely examples and do not limit the scope of the claims. For example, visual information content may vary, visual information configuration may vary, visual information arrangement may vary, and/or the like.

In many circumstances, a user may interact with one or more programs, such as a mapping program, a navigation program, an image viewer program, a video viewer program, and/or the like throughout the day. Programs such as these may provide particular features to a user of the program. For example, an interactive mapping program may offer navigation features, routing information, mapping information, recommendations, notifications, advertising, and/or the like. Such features may be referred to as map functions. For example, the user may utilize an interactive mapping program on an apparatus, such as a cellular telephone, a tablet computer, a laptop, a computer, a head mounted display, a see-through display, and/or the like to investigate points of interest, view imagery associated with various geographical locations, explore visual information that is captured at various geographical locations, and/or the like. Programs such as these may cause display of visual information based, at least in part, on map functions, user inputs, stored data, retrieved data, and/or the like.

Often times, a user may desire to interact with specific portions of map information, explore visual information associated with a particular geographical location, and/or the like. For example, a user may desire to pan across a representation of map information to search for a particular point of interest, may desire to view visual information, such as street-level imagery, video content, etc., associated with a particular location, and/or the like. In this manner, it may be desirable to configure an apparatus such that the apparatus may identify a particular location, identify a particular portion of map information, and/or the like. In at least one example embodiment, an apparatus determines a geographical location. In such an example embodiment, the geographical location may be a location that a user desires to interact with, a location that the user desires to perceive visual information that depicts the location, a location that the user has navigated to within a particular program, and/or the like. The geographical location may, for example, identify a particular location by way of a set of geographical coordinates, a street address, a business name, a point of interest, and/or the like. In some circumstances, an apparatus may determine the geographical location by way of receipt of information indicative of an input that identifies the geographical location, receipt of information indicative of a user input that designates the geographical location, and/or the like. For example, a user may enter a particular address, may identify a geographical location by way of one or more inputs associated with a representation of map information, may click through various user interface elements of an interactive mapping program such that the user arrives at the geographical location, may select a representation of a separate apparatus that is located at the geographical location, such as a camera module of the examples of FIGS. 3A-3B, and/or the like.

Figure 4A:
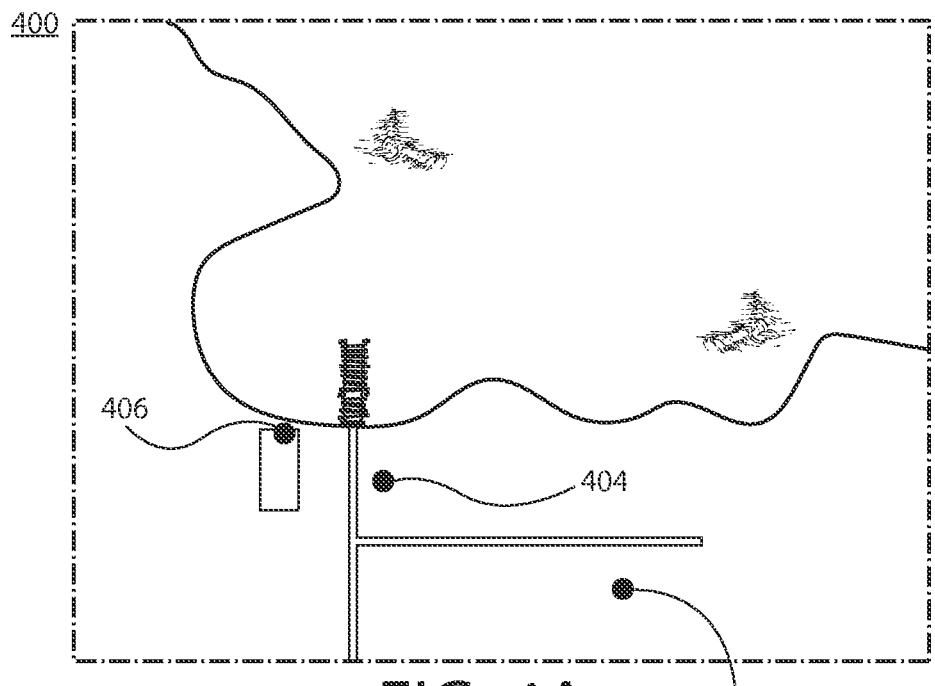
FIGS. 4A-4D are diagrams illustrating visual information that is a view from a geographical location according to at least one example embodiment.

FIG. 4A is a diagram illustrating a representation of map information depicts a plurality of geographical locations according to at least one example embodiment. The example of FIG. 4A depicts geographical locations 402, 404, and 406 in relation to map information 400. Map information 400 is a visual representation of map information. Such map information may, for example, be comprised by the geographical database of FIG. 1. As can be seen in the example of FIG. 4A, geographical locations 402, 404, and 406 are three distinct geographical locations. The example of FIG. 4A depicts a top-down view of a coastal region, and is oriented such that the top of FIG. 4A corresponds with the northern side of the coastal region, the left side of FIG. 4A corresponds with the western side of the coastal region, and/or the like. In the example of FIG. 4A, geographical location 402 is a location that is uphill from the depicted coastline, geographical location 404 is a location that is northwest of location 402 and closer to the dock depicted in map information 400, and geographical location 406 is a location that is northwest of location 404 and closest to the beach and the aforementioned dock.

As discussed previously, in many circumstances, a user may interact with one or more programs, such as an interactive mapping program, a navigation program, a visual information viewer, a video content viewer, and/or the like. In such circumstances, the user may desire to perceive visual information indicative of the surroundings of a particular geographical location, to visually explore a geographical location, and/or the like. In some circumstances, visual information that depicts at least a portion of the environment surrounding a geographical location may be available. For example, in such circumstances, visual information that depicts a view from a particular location may be accessible, may be available to stream, and/or the like. In at least one example embodiment, an apparatus causes display of visual information that is a view from a geographical location. For example, the visual information may be video content captured by a camera module located at a particular geographical location, may be imagery that was captured by a separate apparatus that is located at a specific geographical location, and/or the like. The visual information may be predetermined video content, streaming video content, panoramic video content, panoramic imagery, 360-degree imagery, pannable video content, and/or the like. For example, the visual information may be received from a memory, from a separate apparatus, such as a repository, a visual information provider, a server, a separate apparatus, a camera module of a separate apparatus, and/or the like. In such an example, the visual information may be received from a separate apparatus, from a camera module, etc. by way of one or more intermediate apparatuses, servers, visual information providers, and/or the like. In at least one example embodiment, the visual information is received from a camera module similar as described regarding the examples of FIGS. 3A-3B. For example, the visual information may be captured by a camera module of a stationary camera module of a separate apparatus, by a pan-tilt camera module of a separate apparatus, by a panoramic camera module of a separate apparatus, and/or the like.

Figure 4B:
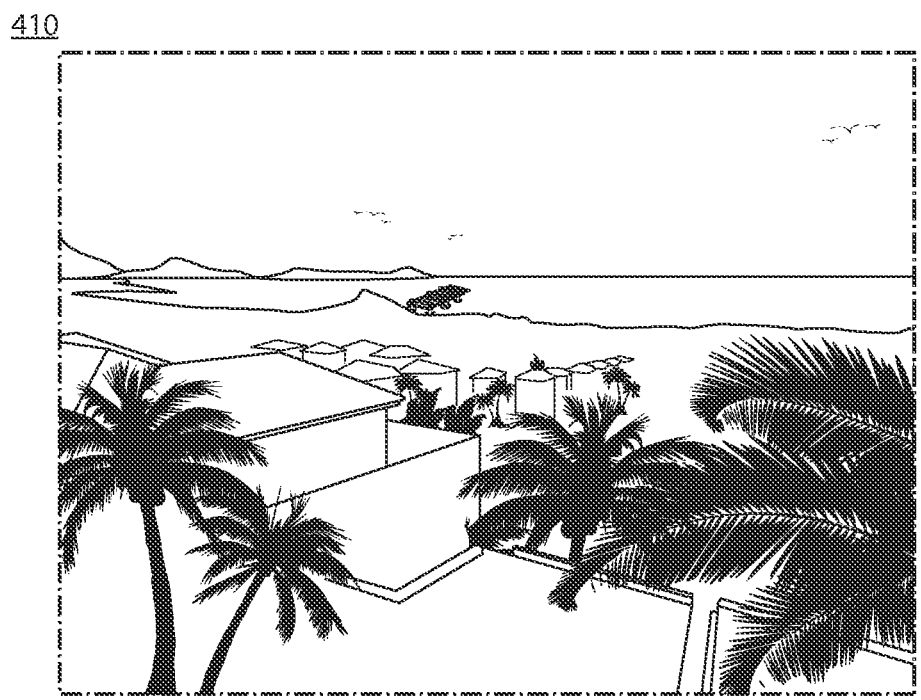

FIG. 4B is a diagram illustrating visual information that is a view from a geographical location according to at least one example embodiment. The example of FIG. 4B depicts visual information 410. As can be seen, visual information 410 depicts the coastal environment depicted in map information 400 of FIG. 4A. Specifically, in the example of FIG. 4B, visual information 410 depicts a view from geographical location 402 of FIG. 4A. The depicted view is a view in a direction that faces northwest, towards geographical location 406 of FIG. 4A. As can be seen in visual information 410, the dock at the coastline that is depicted in map information 400 of FIG. 4A is faintly visible in the distance. Visual information 410 may be a frame of video content that is being rendered, may be street-level imagery, and/or the like. In this manner, a user may view visual information 410, render video content comprised by visual information 410, pan around visual information 410, and/or the like, such that the user may explore geographical location 402 of FIG. 4A by way of visual information 410.

Figure 4C:
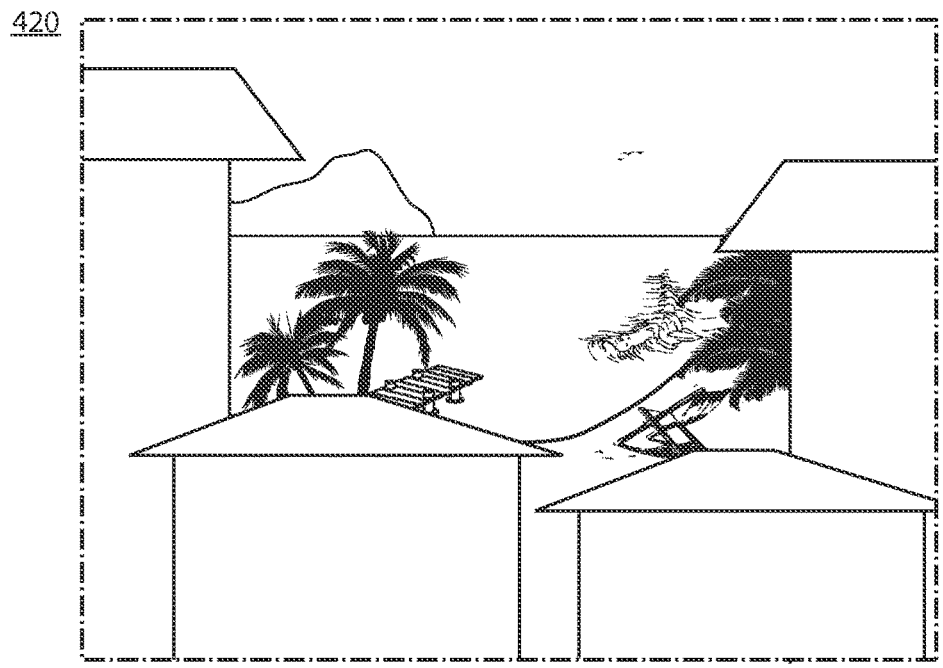

FIG. 4C is a diagram illustrating visual information that is a view from a geographical location according to at least one example embodiment. The example of FIG. 4C depicts visual information 420. As can be seen, visual information 420 depicts the coastal environment depicted in map information 400 of FIG. 4A. Specifically, in the example of FIG. 4C, visual information 420 depicts a view from geographical location 404 of FIG. 4A. The depicted view is a view in a direction that faces northwest, towards geographical location 406 of FIG. 4A. As can be seen by referring to the example map information 400 of FIG. 4A, geographical location 404 is closer to geographical location 406 than geographical location 402 is to geographical 406, and geographical location 404 is located between geographical locations 402 and 406. In this manner, geographical location 404 is intermediate to geographical locations 402 and 406. As can be seen in visual information 420, as geographical location 404 of FIG. 4A is closer to the coastline. As such, visual information 420 depicts additional details associated with the coastline and the dock at the coastline when compared with visual information 410 of FIG. 4B. Visual information 420 may be a frame of video content that is being rendered, may be street-level imagery, and/or the like. In this manner, a user may view visual information 420, render video content comprised by visual information 420, pan around visual information 420, and/or the like, such that the user may explore geographical location 404 of FIG. 4A by way of visual information 420.

Figure 4D:
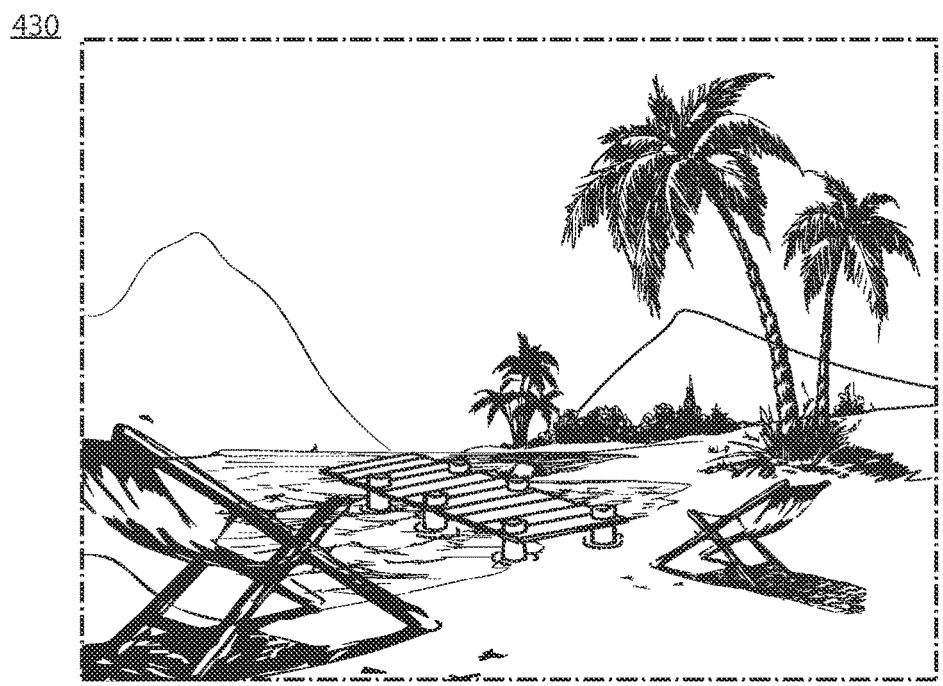

FIG. 4D is a diagram illustrating visual information that is a view from a geographical location according to at least one example embodiment. The example of FIG. 4D depicts visual information 430. As can be seen, visual information 430 depicts the coastal environment depicted in map information 400 of FIG. 4A. Specifically, in the example of FIG. 4D, visual information 430 depicts a view from geographical location 406 of FIG. 4A. The depicted view is a view in a direction that faces northwest. As can be seen by referring to the example map information 400 of FIG. 4A, geographical location 406 is closer to the coastline than both geographical locations 402 and 404. As such, visual information 430 depicts additional details associated with the coastline and the dock at the coastline when compared with visual information 420 of FIG. 4C and visual information 410 of FIG. 4B. Visual information 420 may be a frame of video content that is being rendered, may be street-level imagery, and/or the like. In this manner, a user may view visual information 430, render video content comprised by visual information 430, pan around visual information 430, and/or the like, such that the user may explore geographical location 406 of FIG. 4A by way of visual information 430.

FIGS. 5A-5D are diagrams illustrating visual information that is a view from a geographical location according to at least one example embodiment. The examples of FIGS. 5A-5D are merely examples and do not limit the scope of the claims. For example, visual information content may vary, visual information configuration may vary, visual information arrangement may vary, emphasis indicators may vary, view availability direction indicators may vary, and/or the like.

In some circumstances, a user may desire to explore a particular geographical location by way of viewing of associated visual information in a collaborative manner with another user. For example, the user may desire to explore a particular region with the other user, the user may desire to perceive visual information being explored by the other user, the user may desire to transition from viewing of visual information that is a view from a geographical location to different visual information that is a view from a different geographical information, and/or the like. As such, it may be desirable to configure an apparatus such that the apparatus allows a user of the apparatus to explore various geographical locations in a collaborative manner, to perceive such different visual information, and/or the like. In at least one example embodiment, an apparatus receives an indication of availability of visual information that is a view from a geographical location. For example, the user may be viewing visual information associated with a geographical location by way of the apparatus, and the apparatus may receive an indication of availability of different visual information associated with a different geographical location.

In such circumstances, the indication of availability may indicate that visual information that depicts a view from the different geographical location may be accessible, may be available to stream, and/or the like. The indication of availability of the visual information may be received from a separate apparatus, a server, and/or the like. The visual information may be video content captured by a camera module located at the different geographical location, may be imagery that was captured by a separate apparatus that is located at the different geographical location, and/or the like. The visual information may be predetermined video content, streaming video content, panoramic video content, panoramic imagery, 360-degree imagery, pannable video content, and/or the like. For example, the visual information may be received from a memory, from a separate apparatus, such as a repository, a visual information provider, a server, a separate apparatus, a camera module of a separate apparatus, and/or the like. In such an example, the visual information may be received from a separate apparatus, from a camera module, etc. by way of one or more intermediate apparatuses, servers, visual information providers, and/or the like. In at least one example embodiment, the visual information is received from a camera module similar as described regarding the examples of FIGS. 3A-3B. For example, the visual information may be captured by a camera module of a stationary camera module of a separate apparatus, by a pan-tilt camera module of a separate apparatus, by a panoramic camera module of a separate apparatus, and/or the like.

As described previously, in some circumstances, a user may desire to collaboratively explore, with another user, one or more geographical locations by way of viewing visual information captured at the geographical locations. In such circumstances, it may be desirable to establish an association between the apparatus of the user and a separate apparatus of the other user. For example, the apparatus may be a user apparatus of the user, and the separate apparatus may be another user apparatus of the other user. In at least one example embodiment, an apparatus causes establishment of a view sharing session between the apparatus and a separate apparatus. In such an example embodiment, the indication of availability of the visual information may be received from the separate apparatus based, at least in part, on the view sharing session. In this manner, a view sharing session may be established between the apparatus and the separate apparatus in order to facilitate a collaborative viewing experience, in order to facilitate communications between the apparatus and the separate apparatus, in order to provide a secure manner in which to share visual information, and/or the like. In some circumstances, the indication of availability may be received from a server that manages various visual information associated with various geographical locations, a content platform that is associated with one or more camera modules located at various geographical locations, and/or the like. As such, the server may facilitate establishment of the view share session, may manage the view share session, may act as an intermediary between the apparatus and the separate apparatus, and/or the like.

As described previously regarding the examples of FIGS. 4A-4D, a user may desire to explore a plurality of geographical locations by way of perceiving, interacting with, etc. visual information that is associated with each geographical location. For example, the user may perceive visual information 410 of FIG. 4B, which is a view from geographical location 402 of FIG. 4A, and desire to explore a different geographical location by way of different visual information that is a view from the different geographical location. As discussed previously, an apparatus of the user may receive an indication of availability of such different visual information from a separate apparatus, from another user of the separate apparatus, by way of a view sharing session, and/or the like.

As such, it may be desirable to provide a user of an apparatus, whom is viewing visual information, with an intuitive manner in which to identify that such different visual information is available, that the other user is exploring the different geographical location by way of viewing the different visual information, and/or the like. For example, it may be desirable to cause display of information that conveys the availability of the different visual information, the location of the different geographical location, the direction from the geographical location to the different geographical location, and/or the like to the user. For example, the different geographical location may be in a direction from the geographical location, and the apparatus may determine a position in the visual information that corresponds with the direction. In at least one example embodiment, an apparatus causes display of at least a portion of the different visual information such that the portion of the different visual information overlays the visual information at the position in the visual information. The portion of the different visual information may be a randomly selected portion of the different visual information, may be selected based, at least in part, on a portion of the different visual information that is being viewed by the other user, may be selected based, at least in part, on the content of the portion of the different visual information relative to the entirety of the different visual information, may be selected based, at least in part, on a relative direction from the geographical location depicted in the visual information to the different geographical location depicted in the different visual information, and/or the like. For example, the apparatus may receive a portion designation that identifies the portion of the second visual information. In such an example, the portion of the second visual information is based, at least in part, on the portion designation. The portion designation may be received from another apparatus, a separate apparatus, a server, and/or the like. The overlay of the different visual information may be opaque, semi-opaque, semi-transparent, and/or the like. In at least one example embodiment, the opacity, transparency, etc. of the overlay may be predetermined, user selectable, and/or the like.

In this manner, a user viewing visual information associated with a geographical location may perceive at least a portion of the different visual information associated with the different geographical location such that the portion of the different visual information overlays at least a portion of the visual information, such that the portion of the different visual information conveys a direction from the geographical location to the different geographical location, and/or the like. In this manner, the apparatus may display the visual information and the portion of the different visual information simultaneously, such that the user may perceive both the visual information and the portion of the different visual information.

In some circumstances, a user viewing visual information may desire to share that visual information with another user in a collaborative manner. In at least one example embodiment, an apparatus sends an indication of availability of the visual information to a separate apparatus. The sending of the indication of availability of the visual information to the separate apparatus may be based, at least in part, on a view sharing session between the apparatus and the separate apparatus. In some circumstances, the apparatus may receive a visual information sharing input that indicates a desire to cause the sending of the indication of availability of the first visual information to the separate apparatus. In such circumstances, the sending of the indication of availability of the first visual information to the separate apparatus may be based, at least in part, on the visual information sharing input. Such a visual information sharing input may be a touch input, a gesture input, a hover input, and/or the like that conveys a user desire to share the visual information with a separate apparatus. Further, the user may have panned to a particular portion of the visual information, may desire to share a particular portion of the visual information with the other user, and/or the like. For example, an apparatus may display a portion, which is less than an entirety, of the visual information. In such an example, the visual information may be dimensioned, framed, cropped, etc. such that only a portion of the visual information may be displayed, such that the user may pan within the visual information, and/or the like. In such an example, the apparatus may send a portion designation that identifies the portion of the visual information to the separate apparatus. In this manner, the user of the separate apparatus may perceive the same portion of the visual information that is being viewed by the user of the apparatus, may perceive the portion of the visual information designated a portion designation input, and/or the like. Such a portion designation input may be a touch input, a gesture input, a hover input, and/or the like that designates the portion of the visual information. Similarly, the user of the apparatus may pan a particular path, zoom into various objects depicted in the visual information in a certain sequence, and/or the like, and desire to share this path, this sequence, and/or the like with another user. In such an example, the apparatus may send a portion designation that identifies a plurality of portions of the visual information, a path that was panned by the user, and/or the like, to the separate apparatus. In this manner, the other user may perceive the visual information as the user perceived the visual information, explore the visual information in the sequence that the user explored the visual information, and/or the like.

In some circumstances, the visual information may be associated with audio information. Such audio information may be audio information associated with the geographical location at which the visual information was captured, audio information that was captured at the geographical location, and/or the like. For example, the visual information may be video content, and the audio information may correspond with the video content, may be comprised by the video content, the audio information may be audio information that is synchronized with the visual information, and/or the like. In at least one example embodiment, an apparatus causes rendering of audio information that corresponds with visual information based, at least in part, on the display of the visual information. As discussed previously, an apparatus may receive an indication of availability of different visual information and, in response, cause display of a portion of the different visual information such that the different visual information at least partially overlays the visual information. In such circumstances, it may be desirable to convey different audio information associated with the different geographical location to the user. In this manner, the user may be able to hear audio information from the geographical location, audio information from the different geographical location, and/or the like.

In at least one example embodiment, an apparatus causes rendering of different audio information that corresponds with the different visual information contemporaneously with the rendering of the audio information, such that a user may hear noises, sounds, etc. associated with the different geographical location which may pique the user's interest, attract the user's attention, and/or the like. Such rendering of the different audio information may be based, at least in part, on the display of the portion of the different visual information. In such an example embodiment, the rendering of the different audio information may be performed such that the rendering conveys a spatial property of the different audio information, of the different geographical location relative to the geographical location, and/or the like. In this manner, an apparent direction from which a user hears the different audio information may be indicative of a direction from the geographical location to the different geographical location.

Figure 5A:
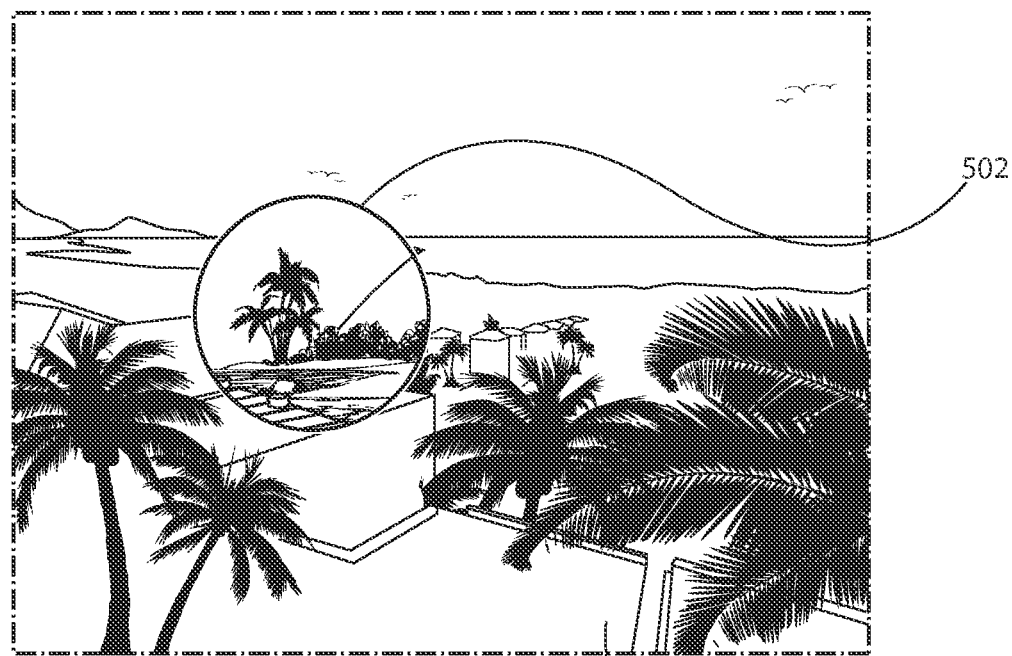
FIGS. 5A-5D are diagrams illustrating visual information that is a view from a geographical location according to at least one example embodiment.

FIG. 5A is a diagram illustrating display of a portion of a second visual information such that the portion of the second visual information overlays a first visual information at a position in the first visual information according to at least one example embodiment. The example of FIG. 5A depicts visual information 410, visual information that depicts a view from a geographical location, in relation to portion 502, a portion of different visual information that depicts a view from a different geographical location. As can be seen, visual information 410 corresponds with visual information 410 of FIG. 4B. In this manner, visual information 410 depicts a view from geographical location 402 of FIG. 4A. As can be seen, portion 502 depicts a portion of visual information 430 of FIG. 4D. In this manner, portion 502 depicts a portion of a view from geographical location 406 of FIG. 4A. In the example of FIG. 5A, an apparatus of a user viewing visual information 410 may receive an indication of availability of different visual information and, in response, cause display of a portion of the different visual information. As can be seen, portion 502 is displayed at a position relative to visual information 410 that corresponds with the direction from the geographical location to the different geographical location. For example, it can be seen that location 406 of FIG. 4A is adjacent to a dock. As such, it can be seen that the position of portion 502 relative to visual information 410 corresponds with the position of the dock in visual information 410 of FIG. 4B. In this manner, the position of portion 502 relative to visual information 410 may convey to a user the direction to the different geographical location, a portion of the visual information comprising a depiction of the different geographical location, and/or the like.

In some circumstances, it may be desirable to emphasize a particular portion of visual information. For example, a user perceiving the visual information may find the visual information particularly aesthetically pleasing, exciting, beautiful, etc., and may desire to draw another user's attention towards the portion of the visual information such that the other user may also enjoy the view depicted in the visual information. In at least one example embodiment, an apparatus receives an indication of an emphasis request. Such an emphasis request may be a request to cause visual emphasis, auditory emphasis, tactile emphasis, etc. of the portion of the visual information. The emphasis request may be received from a separate apparatus, a server, and/or the like. In such an example embodiment, in response to the emphasis request, the apparatus may cause display of an emphasis indicator that comprises visual information, audio information, tactile information, and/or the like that is configured to emphasize the position in the visual information. For example, the emphasis indicator may highlight the portion of the visual information, may point towards the portion of the visual information, may animate one or more aspect of the visual information, and/or the like. In another example, the emphasis indicator may comprise spatial audio information that indicates a direction towards the portion of the visual information, may cause an increase in the magnitude, volume, etc. of rendering of audio information associated with the visual information, and/or the like.

Similarly, a user that is viewing visual information by way of the user's apparatus may desire to share the visual information with another user, and emphasize the visual information such that the other user is more inclined to view the visual information with the user. In at least one example embodiment, an apparatus causes sending of an indication of an emphasis request to a separate apparatus. In such an example embodiment, the emphasis request may be a request to cause visual emphasis of a portion of the visual information, such that the separate apparatus is caused to display an emphasis indicator associated with the portion of the visual information. The apparatus may send the indication of the emphasis request in response to a user input, may send the emphasis request automatically in response to sharing of the visual information by way of a view sharing session, and/or the like. In at least one example embodiment, an apparatus receives a visual information emphasis input that indicates a desire to cause the sending of the indication of the emphasis request to the separate apparatus. In such an example embodiment, the sending of the indication of the emphasis request to the separate apparatus may be based, at least in part, on the visual information emphasis input.

Figure 5B:
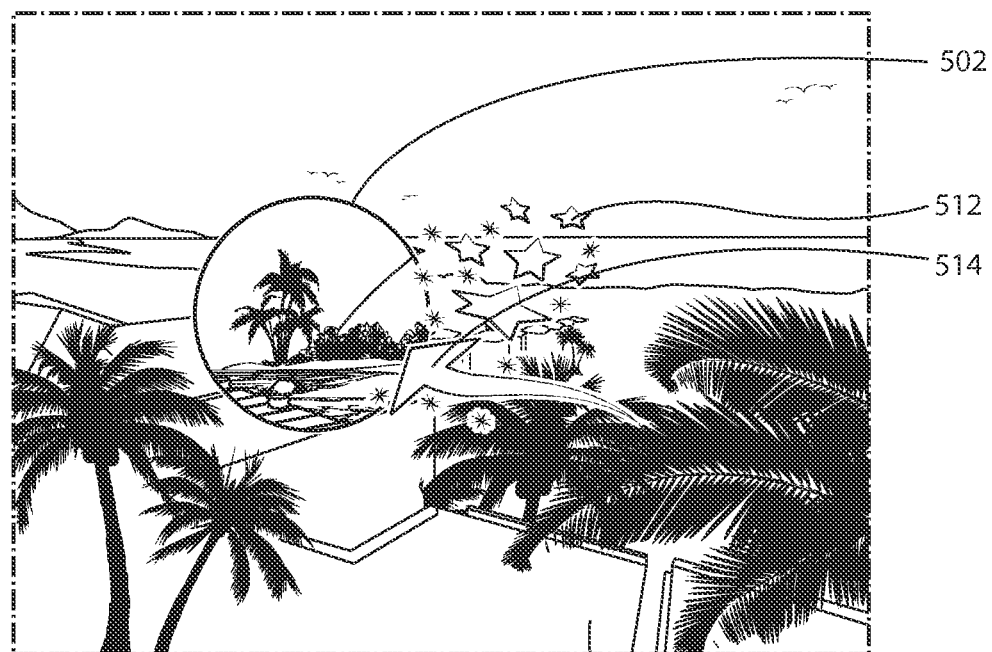

FIG. 5B is a diagram illustrating emphasis indicators according to at least one example embodiment. The example of FIG. 5B depicts visual information 410, visual information that depicts a view from a geographical location, in relation to portion 502, a portion of different visual information that depicts a view from a different geographical location, and emphasis indicators 512 and 514. As can be seen, visual information 410 and portion 502 of FIG. 5B correspond with visual information 410 and portion 502 of FIG. 5A. As such, visual information 410 and portion 502 of FIG. 5B may be similar as described regarding the example of FIG. 5A. As can be seen, emphasis indicators 512 and 514 emphasize portion 502 such that the attention of a user viewing the information depicted in the example of FIG. 5B may be drawn towards portion 502, directed towards the visual information comprised by portion 502, and/or the like. For example, emphasis indicator 512 may comprise animated visual information that floats towards portion 502, is seemingly sucked into portion 502 with a wormhole-like effect, and/or the like. In the example of FIG. 5B, emphasis indicator 514 is an arrow that points towards portion 502. Emphasis indicator 514 may be static, may dynamically float about portion 502, may strobe or pulse in order to emphasize portion 502, and/or the like.

As discussed previously, in some circumstances, visual information may be dimensioned, zoomed into, etc. such that only a portion of the visual information may be displayed by an apparatus, such that the user of the apparatus may perceive less than the entirety of the visual information, and/or the like. In such an example, the apparatus may receive an indication of availability of different visual information that is a view from a different geographical location that is in a direction from the geographical location that fails to correspond with the portion of the visual information that is being displayed. In this manner, the direction may correspond with a position in the visual information that fails to be displayed, that fails to be comprised by the portion of the visual information that is displayed, and/or the like. In at least one example embodiment, an apparatus determines that the direction fails to correspond with any position in the portion of the visual information, and causes display of a view availability direction indicator that indicates a view availability direction towards the position in the visual information. Such a view availability direction indicator may comprise visual information, audio information, tactile information, and/or the like that indicates the view availability direction towards the position in the first visual information. For example, the view availability indicator may comprise visual information that depicts static, animated, etc. sparkles, leaves, or other particle effects that indicate the view availability direction, that float towards the position in the visual information, that extend towards an edge of the portion of the visual information that is displayed in the view availability direction, and/or the like. At least in some embodiments, the view availability indicator may depend contextually on the visual information. For example, if the visual information depicts trees, the view availability indicator may comprise a visual representation of leaves that float from the trees to the position in the visual information. In another example, if the visual information depicts a sandy beach, the view ability indicator may comprise a visual representation of sand that indicates the view availability direction. In another example, the view availability direction indicator may be the portion of the different visual information. In such an example, the view availability direction indicator may be caused to be displayed at a central position in the portion of the visual information that is displayed, and may be caused to be moved from the central position in the visual information to the position in the visual information in a dynamic and animated manner.

In order to facilitate user perception of the portion of the different visual information, of the position in the visual information, and/or the like, it may be desirable to pan the portion of the visual information such that the position in the visual information corresponds with the portion of the visual information. In at least one example embodiment, an apparatus causes panning of the portion of the visual information such that the position in the visual information becomes included in the portion of the visual information. In some circumstances, the causation of the panning of the portion of the visual information may be performed absent receipt of user input that indicates a desire to cause the panning of the portion of the visual information. For example, the panning may be performed automatically based, at least in part, on the receipt of the indication of availability, the determination that the position in the visual information fails to correspond with any position in the portion of the visual information, the receipt of an indication of an emphasis request, the establishment of a view sharing session, and/or the like. In some circumstances, the apparatus may receive a panning input that indicates a desire to cause panning of the portion of the visual information. In such circumstances, the causation of the panning of the portion of the visual information may be performed in response to the panning input. The panning input may be a touch input, a gesture input, a hover input, a gaze tracking input and/or orientation input associated with a head mounted display, and/or the like. For example, a user wearing a head mounted display may rotate the user's head, turn the user's body, and/or the like in order to pan within the visual information. Subsequent to panning of the portion of the visual information such that the position in the visual information corresponds with the portion of the visual information, the apparatus may cause display of the portion of the different visual information.

Figure 5C:
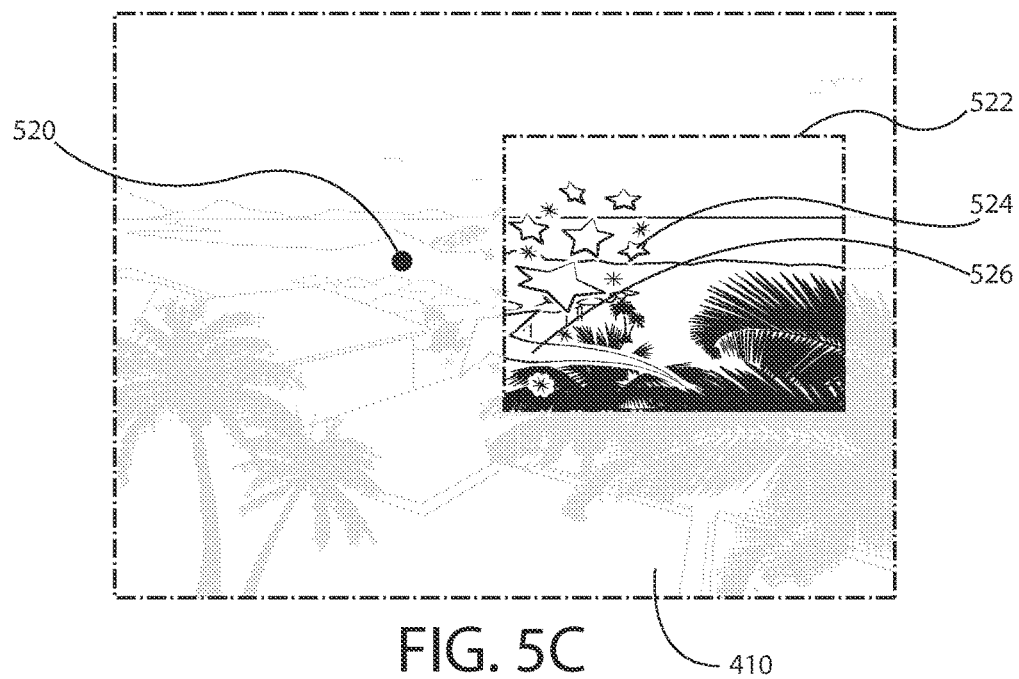

FIG. 5C is a diagram illustrating a view availability direction indicator according to at least one example embodiment. The example of FIG. 5C depicts visual information 410, visual information that depicts a view from a geographical location, in relation to position 520, a position that corresponds with a direction towards a different geographical location that is associated with visual information that depicts a view from the different geographical location. As can be seen, visual information 410 corresponds with visual information 410 of FIG. 4B. In this manner, visual information 410 depicts a view from geographical location 402 of FIG. 4A. As can be seen, position 520 corresponds with the depiction of geographical location 406 of FIG. 4A within visual information 410. It can be seen that position 520 is proximate to the dock, as depicted in the example of FIG. 4A. In the example of FIG. 5C, an apparatus of a user viewing visual information 410 may receive an indication of availability of different visual information. It can be seen that only viewable area 522 of visual information 410 is displayed. As such, the apparatus may determine that position 520 fails to correspond with any position within viewable area 522 and, in response, cause display of view availability direction indicators 524 and 526. As can be seen, view availability direction indicators 524 and 526 indicate a view availability direction towards position 520 in visual information 410 such that the attention of a user viewing the information depicted in the example of FIG. 5C may be drawn towards position 520, the user may be informed that a portion of different visual information is available at a position in visual information 410 that the user cannot currently perceive, and/or the like. For example, view availability direction indicator 524 may comprise animated visual information that floats towards position 520, is seemingly drawn towards position 520 with a wormhole-like warping effect, and/or the like. In the example of FIG. 5C, view availability direction indicator 526 is an arrow that points towards position 520. View availability direction indicator 526 may be static, may dynamically wiggle about position 520, may strobe or pulse in order to emphasize position 520, and/or the like.

Figure 5D:
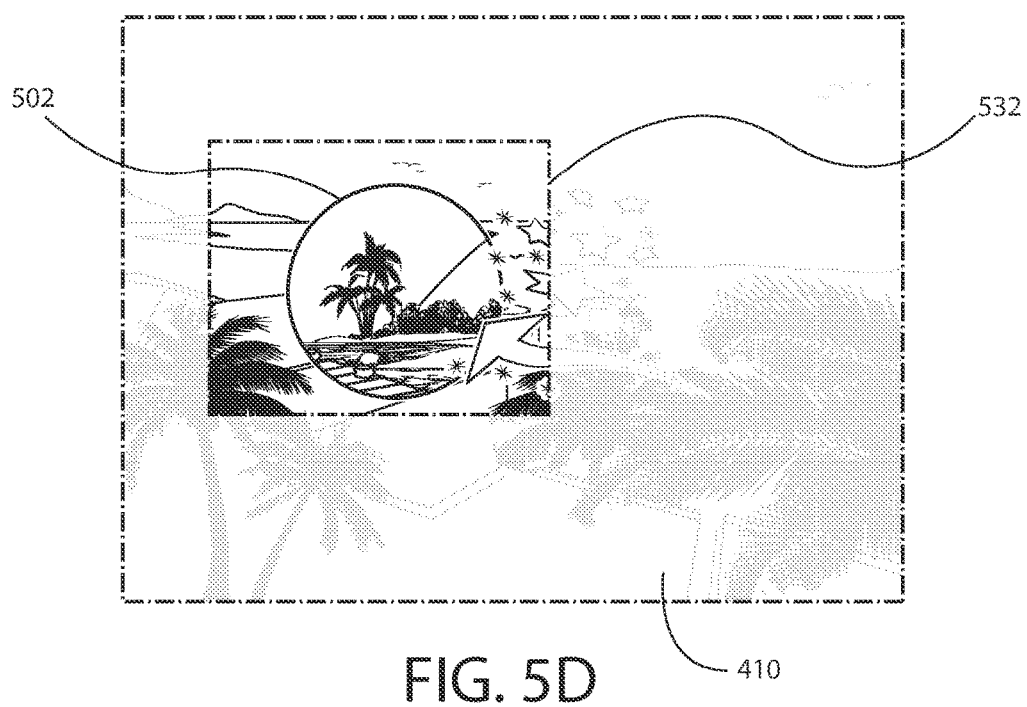

FIG. 5D is a diagram illustrating display of a portion of a second visual information such that the portion of the second visual information overlays a first visual information at a position in the first visual information according to at least one example embodiment. The example of FIG. 5D depicts visual information 410, visual information that depicts a view from a geographical location, in relation to portion 502, a portion of different visual information that depicts a view from a different geographical location. As can be seen, visual information 410 and portion 502 of FIG. 5D correspond with visual information 410 and portion 502 of FIG. 5A. As such, visual information 410 and portion 502 of FIG. 5D may be similar as described regarding the example of FIG. 5A. As can be seen, the example of FIG. 5D corresponds with the example of FIG. 5C subsequent to panning of viewable area 522 of FIG. 5C to viewable area 532 depicted in FIG. 5D. As can be seen, position 520 of FIG. 5C corresponds with a position within viewable area 532. As such, the apparatus may cause display of portion 502 in response to the panning of viewable region 522 of FIG. 5C such that position 520 of FIG. 5C corresponds with a position within viewable region 532 of FIG. 5D.

In order to facilitate user exploration of various different geographical locations by way of various different visual information, it may be desirable to configure an apparatus such that a user of the apparatus may expand a portion of different visual information, may join another user in viewing the same visual information, and/or the like. In at least one example embodiment, an apparatus receives a selection input that indicates selection of the portion of the visual information, and causes display of the visual information based, at least in part, on the selection input. For example, the apparatus may display a greater portion of the visual information, the entirety of the visual information, and/or the like. In at least one example embodiment, an apparatus causes termination of display of different visual information based, at least in part, on the selection input, the display of the visual information, and/or the like. For example, an apparatus of a user may display visual information, receive an indication of availability of different visual information, and display a portion of the different visual information. The user may select the portion of the different visual information by way of a selection input associated with the different visual information and, in response, cause termination of display of the visual information, cause display of the different visual information, and/or the like.

In some circumstances, it may be desirable to transition from display of visual information to display of different visual information in an aesthetically pleasing and/or smooth manner such that the transition conveys movement from the geographical location associated with the visual information to the different geographical location associated with the different visual information. In at least one example embodiment, display of visual information comprises causation of display of a transition animation that transitions from display of different visual information to display of the visual information. Such a transition animation may be displayed based, at least in part, on the selection input. In some circumstances, it may be desirable to display visual information that is associated with another geographical location that is intermediate to the geographical location and the different geographical location. In this manner, a user may perceive a more fluid and/or informative transition animation, better understand the context of the various geographical locations, and/or the like. In at least one example embodiment, an apparatus determines availability of intermediate visual information that is a view from an intermediate geographical location that is intermediate to a geographical location and a different geographical location. In such an example embodiment, the intermediate visual information that depicts a view from the intermediate geographical location may be displayed relative to the visual information that depicts a view from the geographical location and the overlay of the portion of the different visual information that depicts a view from the different geographical location. In this manner, the user may perceive a wormhole-like tube that navigates through the intermediate geographical location and connects the visual information with the different visual information. In such an example embodiment, the transition animation may transition from the display of the visual information to display of the intermediate visual information and display of the intermediate visual information to display of the different visual information. In this manner, the user may perceive movement from the geographical location, to the intermediate geographical location, and, subsequently, to the different geographical location. In some circumstances, a transition animation may comprise street-level imagery associated with a route between a geographical location and a different geographical location, may cause warping of the visual information and/or the different visual information into a tunnel-like or wormhole-like shape such that the transition animation conveys the separation of the geographical location from the different geographical location, the movement to the different geographical location from the geographical location, and/or the like.

Figure 6:
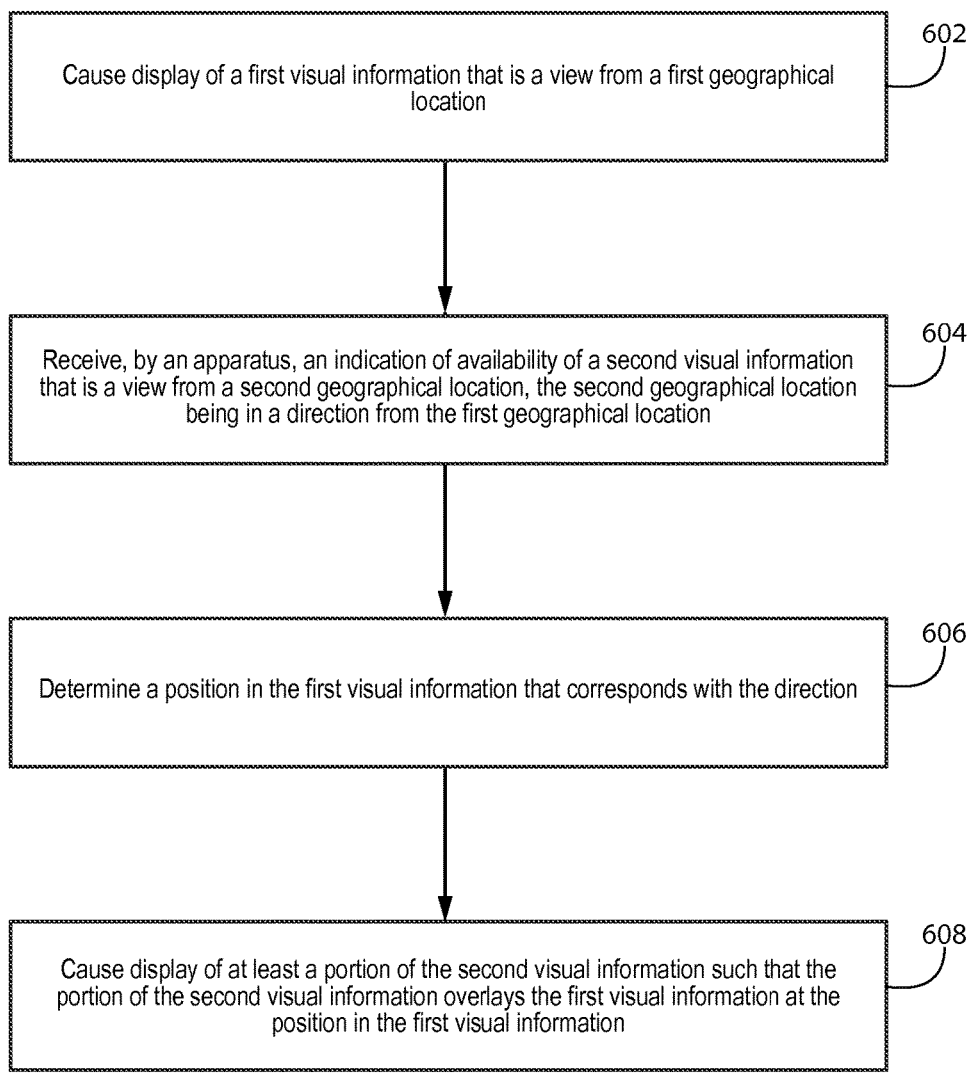
FIG. 6 is a flow diagram illustrating activities associated with causing display of at least a portion of second visual information such that the portion of the second visual information overlays first visual information according to at least one example embodiment.

FIG. 6 is a flow diagram illustrating activities associated with causing display of at least a portion of second visual information such that the portion of the second visual information overlays first visual information according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 6.

At block 602, the apparatus causes display of a first visual information that is a view from a first geographical location. The causation of display, the first visual information, the first geographical location, and the view from the first geographical location may be similar as described regarding FIGS. 3A-3B and FIGS. 4A-4D.

At block 604, the apparatus receives an indication of availability of a second visual information that is a view from a second geographical location. In at least one example embodiment, the second geographical location is in a direction from the first geographical location. The receipt, the indication of availability, the second visual information, the second geographical location, the view from the second geographical location, and the direction may be similar as described regarding FIGS. 2A-2B, FIGS. 3A-3B, FIGS. 4A-4D, and FIGS. 5A-5D.

At block 606, the apparatus determines a position in the first visual information that corresponds with the direction. The determination and the position may be similar as described regarding FIGS. 4A-4D and FIGS. 5A-5D.

At block 608, the apparatus causes display of at least a portion of the second visual information such that the portion of the second visual information overlays the first visual information at the position in the first visual information. The causation of display and the portion of the second visual information may be similar as described regarding FIGS. 4A-4D and FIGS. 5A-5D.

Figure 7:
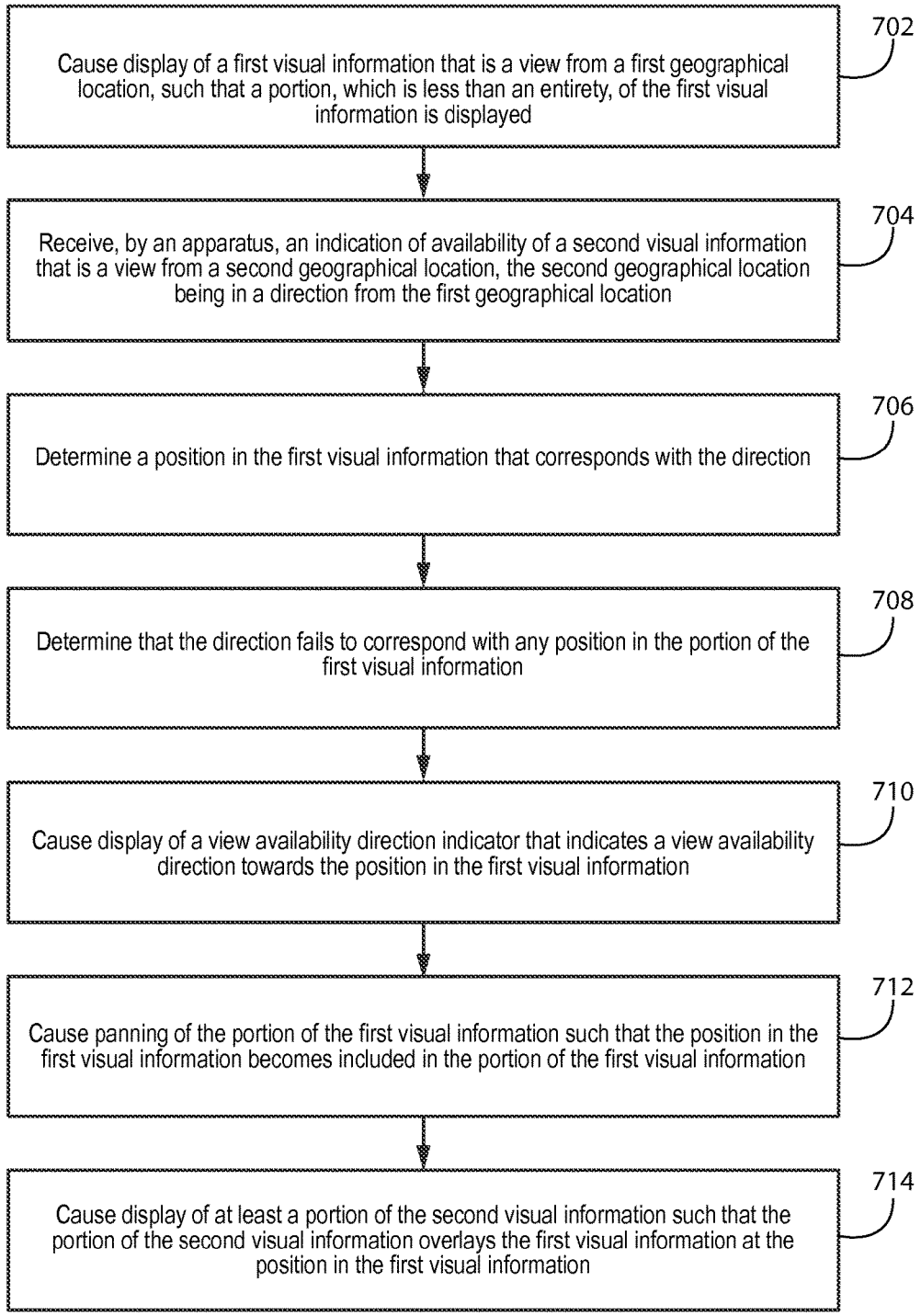
FIG. 7 is a flow diagram illustrating activities associated with causing display of a view availability direction indicator according to at least one example embodiment.

FIG. 7 is a flow diagram illustrating activities associated with causing panning of a portion of first visual information according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 7.

As discussed previously, in some circumstances, it may be desirable to cause display of a view availability direction indicator that indicates a view availability direction towards a position in a first visual information.

At block 702, the apparatus causes display of a first visual information that is a view from a first geographical location, such that a portion, which is less than an entirety, of the first visual information is displayed. The causation of display, the first visual information, the portion of the first visual information, the first geographical location, and the view from the first geographical location may be similar as described regarding FIGS. 3A-3B, FIGS. 4A-4D, and FIGS. 5A-5D.

At block 704, the apparatus receives an indication of availability of a second visual information that is a view from a second geographical location. In at least one example embodiment, the second geographical location is in a direction from the first geographical location. The receipt, the indication of availability, the second visual information, the second geographical location, the view from the second geographical location, and the direction may be similar as described regarding FIGS. 2A-2B, FIGS. 3A-3B, FIGS. 4A-4D, and FIGS. 5A-5D.

At block 706, the apparatus determines a position in the first visual information that corresponds with the direction. The determination and the position may be similar as described regarding FIGS. 4A-4D and FIGS. 5A-5D.

At block 708, the apparatus determines that the direction fails to correspond with any position in the portion of the first visual information. The determination may be similar as described regarding FIGS. 4A-4D and FIGS. 5A-5D.

At block 710, the apparatus causes display of a view availability direction indicator that indicates a view availability direction towards the position in the first visual information. The causation of display, the view availability direction indicator, and the view availability direction may be similar as described regarding FIGS. 4A-4D and FIGS. 5A-5D.

At block 712, the apparatus causes panning of the portion of the first visual information such that the position in the first visual information becomes included in the portion of the first visual information. The causation of panning may be similar as described regarding FIGS. 4A-4D and FIGS. 5A-5D.

At block 714, the apparatus causes display of at least a portion of the second visual information such that the portion of the second visual information overlays the first visual information at the position in the first visual information. The causation of display and the portion of the second visual information may be similar as described regarding FIGS. 4A-4D and FIGS. 5A-5D.

Figure 8:
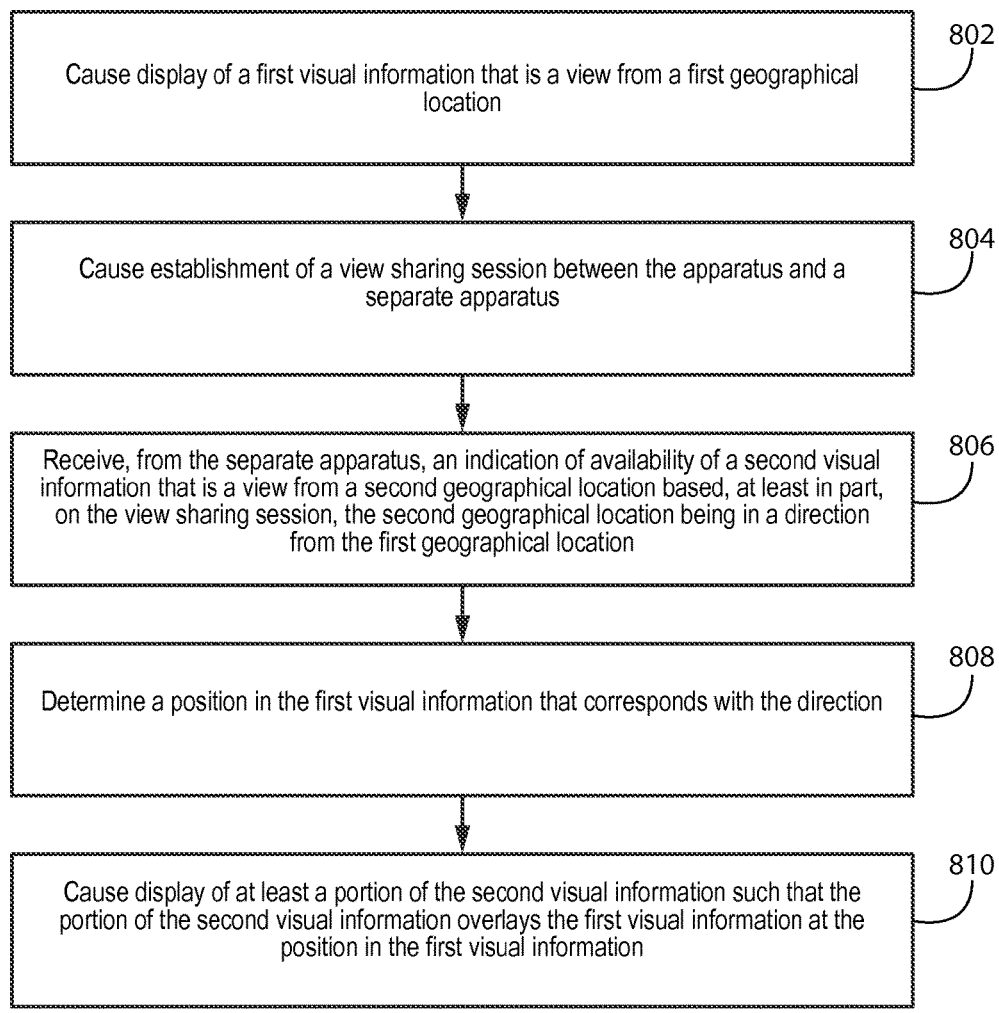
FIG. 8 is a flow diagram illustrating activities associated with causing establishment of a view sharing session according to at least one example embodiment.

FIG. 8 is a flow diagram illustrating activities associated with causing establishment of a view sharing session according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 8.

As discussed previously, in some circumstances, is may be desirable to cause establishment of a view sharing session between an apparatus and a separate apparatus.

At block 802, the apparatus causes display of a first visual information that is a view from a first geographical location. The causation of display, the first visual information, the first geographical location, and the view from the first geographical location may be similar as described regarding FIGS. 3A-3B and FIGS. 4A-4D.

At block 804, the apparatus causes establishment of a view sharing session between the apparatus and a separate apparatus. The causation of establishment and the view sharing session may be similar as described regarding FIGS. 2A-2B, FIGS. 4A-4D, and FIGS. 5A-5D.

At block 806, the apparatus receives an indication of availability of a second visual information that is a view from a second geographical location based, at least in part, on the view sharing session. In at least one example embodiment, the second geographical location is in a direction from the first geographical location. The receipt, the indication of availability, the second visual information, the second geographical location, the view from the second geographical location, and the direction may be similar as described regarding FIGS. 2A-2B, FIGS. 3A-3B, FIGS. 4A-4D, and FIGS. 5A-5D.

At block 808, the apparatus determines a position in the first visual information that corresponds with the direction. The determination and the position may be similar as described regarding FIGS. 4A-4D and FIGS. 5A-5D.

At block 810, the apparatus causes display of at least a portion of the second visual information such that the portion of the second visual information overlays the first visual information at the position in the first visual information. The causation of display and the portion of the second visual information may be similar as described regarding FIGS. 4A-4D and FIGS. 5A-5D.

Figure 9:
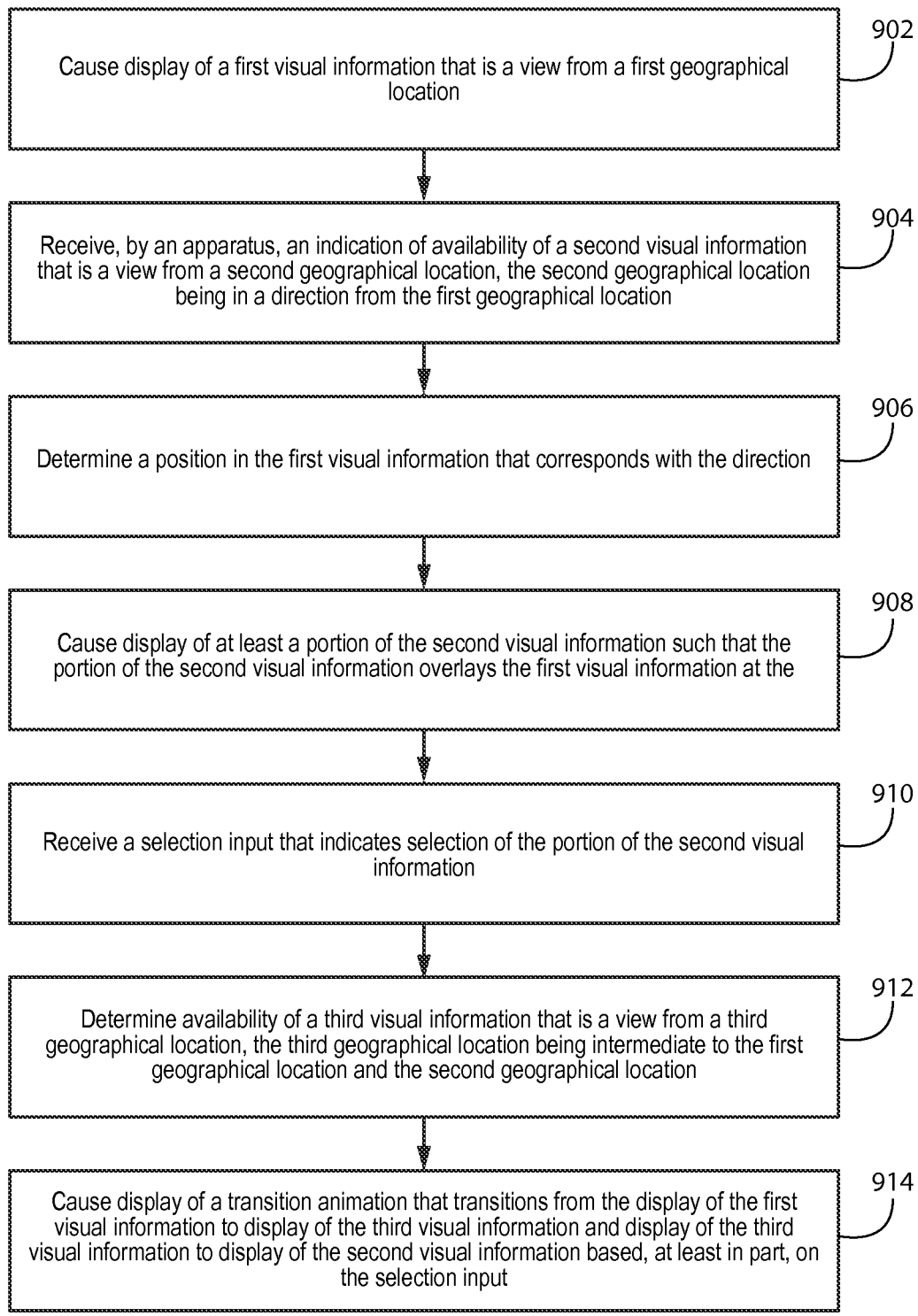
FIG. 9 is a flow diagram illustrating activities associated with causing display of a transition animation according to at least one example embodiment.

FIG. 9 is a flow diagram illustrating activities associated with causing display of a transition animation according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 9.

As discussed previously, in some circumstances, it may be desirable to cause display of a transition animation that transitions from the display of visual information to display of different visual information.

At block 902, the apparatus causes display of a first visual information that is a view from a first geographical location. The causation of display, the first visual information, the first geographical location, and the view from the first geographical location may be similar as described regarding FIGS. 3A-3B and FIGS. 4A-4D.

At block 904, the apparatus receives an indication of availability of a second visual information that is a view from a second geographical location. In at least one example embodiment, the second geographical location is in a direction from the first geographical location. The receipt, the indication of availability, the second visual information, the second geographical location, the view from the second geographical location, and the direction may be similar as described regarding FIGS. 2A-2B, FIGS. 3A-3B, FIGS. 4A-4D, and FIGS. 5A-5D.

At block 906, the apparatus determines a position in the first visual information that corresponds with the direction. The determination and the position may be similar as described regarding FIGS. 4A-4D and FIGS. 5A-5D.

At block 908, the apparatus causes display of at least a portion of the second visual information such that the portion of the second visual information overlays the first visual information at the position in the first visual information. The causation of display and the portion of the second visual information may be similar as described regarding FIGS. 4A-4D and FIGS. 5A-5D.

At block 910, the apparatus receives a selection input that indicates selection of the portion of the second visual information. The receipt and the selection input may be similar as described regarding FIGS. 2A-2B, FIGS. 4A-4D, and FIGS. 5A-5D.

At block 912, the apparatus determines availability of a third visual information that is a view from a third geographical location. In at least one example embodiment, the third geographical location is intermediate to the first geographical location and the second geographical location. The causation of display, the third visual information, the third geographical location, and the view from the third geographical location may be similar as described regarding FIGS. 3A-3B, FIGS. 4A-4D, and FIGS. 5A-5D.

At block 914, the apparatus causes display of a transition animation that transitions from the display of the first visual information to display of the third visual information and display of the third visual information to display of the second visual information based, at least in part, on the selection input. The causation of display and the transition animation may be similar as described regarding FIGS. 3A-3B, FIGS. 4A-4D, and FIGS. 5A-5D.

One or more example embodiments may be implemented in software, hardware, application logic or a combination of software, hardware, and application logic. The software, application logic and/or hardware may reside on the apparatus, a separate apparatus, or a plurality of separate apparatuses. If desired, part of the software, application logic and/or hardware may reside on the apparatus, part of the software, application logic and/or hardware may reside on a separate apparatus, and part of the software, application logic and/or hardware may reside on a plurality of separate apparatuses. In an example embodiment, the application logic, software or an instruction set is maintained on any one of various computer-readable media.

If desired, the different functions discussed herein may be performed in a different order and/or concurrently with each other. For example, block 804 of FIG. 8 may be performed prior to block 802 of FIG. 8. Furthermore, if desired, one or more of the above-described functions may be optional or may be combined. For example, block 710 of FIG. 7 may be optional and/or combined with block 712 of FIG. 7.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. A method comprising:
   causing display, by an apparatus, of first visual information that is a view from a first geographical location;
   receiving, by the apparatus, second visual information that is a view from a second geographical location and audio information that corresponds to the view from the second geographical location, the second geographical location being in a first direction from the first geographical location;
   determining, by the apparatus, a position in the first visual information that corresponds with the first direction;
   receiving a selection input that indicates selection of a portion of the second visual information; and
   based on the selection, causing display, by the apparatus, of the portion of the second visual information such that the portion of the second visual information overlays the first visual information at the position in the first visual information, and rendering with the portion of the second visual information the received audio information that corresponds to the view from the second geographical location,
   wherein the rendering comprises conveying spatial audio information associated with the received audio information to indicate the first direction from the first geographical location to the second geographical location, and wherein the display of the second visual information comprises display of a transition animation that transitions from display of the first visual information to display of the second visual information based, at least in part, on the selection input.

2. The method of claim 1, further comprising:
establishing a view sharing session between the apparatus and a separate apparatus, wherein indication of an availability of the second visual information is received from the separate apparatus based, at least in part, on the view sharing session.

3. The method of claim 2, further comprising:
receiving an indication of an emphasis request from the separate apparatus; and
causing display of an emphasis indicator that comprises visual information that is configured to emphasize the position in the first visual information in response to the emphasis request.

4. The method of claim 3, wherein the emphasis request is a request to cause visual emphasis of the portion of the second visual information.

5. The method of claim 1, further comprising receiving a portion designation that identifies the portion of the second visual information, wherein the portion of the second visual information is identified based, at least in part, on the portion designation.

6. The method of claim 1, wherein the display of the first visual information is performed such that a portion, which is less than an entirety, of the first visual information is displayed, and further comprising:
determining that the first direction fails to correspond with any position in the portion of the first visual information;
causing display of a view availability direction indicator that indicates a direction towards the position in the first visual information; and
causing panning of the portion of the first visual information such that the position in the first visual information becomes included in the portion of the first visual information.

7. The method of claim 6, wherein the view availability direction indicator comprises visual information that indicates the direction towards the position in the first visual information.

8. The method of claim 6, wherein the view availability direction indicator is the portion of the second visual information, the view availability direction indicator is caused to be displayed at a central position in the first visual information, and further comprising causing movement of the view availability direction indicator from the central position in the first visual information to the position in the first visual information.

9. The method of claim 1, further comprising determining availability of a third visual information that is a view from a third geographical location, the third geographical location being intermediate to the first geographical location and the second geographical location, wherein the transition animation transitions from the display of the first visual information to display of the third visual information and display of the third visual information to display of the second visual information.

10. The method of claim 1, wherein the first visual information is visual information that is received from a first camera module located at the first geographical location, and the second visual information is visual information that is received from a second camera module located at the second geographical location.

11. At least one non-transitory computer readable medium comprising instructions that, when executed, perform the method of claim 1.

12. An apparatus comprising:
at least one processor; and
at least one memory including computer program code, where the at least one memory and the computer program code are configured, with the at least one processor, to cause the apparatus to at least:
display a first visual information that is a view from a first geographical location;
receive second visual information that is a view from a second geographical location and audio information that corresponds to the view from the second geographical location, the second geographical location being in a first direction from the first geographical location;
determine a position in the first visual information that corresponds with the first direction;
receive a selection input that indicates selection of a portion of the second visual information; and
based on the selection, display the portion of the second visual information such that the portion of the second visual information overlays the first visual information at the position in the first visual information, and render with the portion of the second visual information the received audio information that corresponds to the view from the second geographical location,
wherein the rendering comprises conveying spatial audio information associated with the received audio information to indicate the first direction from the first geographical location to the second geographical location, and
wherein the display of the second visual information comprises display of a transition animation that transitions from display of the first visual information to display of the second visual information based, at least in part, on the selection input.

13. The apparatus of claim 12, wherein the at least one memory including the computer program code is configured with the at least one processor to cause the apparatus to:
establish a view sharing session between the apparatus and a separate apparatus, wherein indication of an availability of the second visual information is received from the separate apparatus based, at least in part, on the view sharing session.

14. The apparatus of claim 13, wherein the at least one memory including the computer program code is configured with the at least one processor to cause the apparatus to:
receive an indication of an emphasis request from the separate apparatus; and
display an emphasis indicator that comprises visual information that is configured to emphasize the position in the first visual information in response to the emphasis request.

15. The apparatus of claim 14, wherein the emphasis request is a request to cause visual emphasis of the portion of the second visual information.

16. The apparatus of claim 12, wherein the at least one memory including the computer program code is configured with the at least one processor to cause the apparatus to:
receive a portion designation that identifies the portion of the second visual information, wherein the portion of the second visual information is identified based, at least in part, on the portion designation.

17. The apparatus of claim 12, wherein the display of the first visual information is performed such that a portion, which is less than an entirety, of the first visual information is displayed, and wherein the at least one memory including the computer program code is configured with the at least one processor to cause the apparatus to:

determine that the first direction fails to correspond with any position in the portion of the first visual information;

display a view availability direction indicator that indicates a direction towards the position in the first visual information; and pan the portion of the first visual information such that the position in the first visual information becomes included in the portion of the first visual information.

18. The apparatus of claim 17, wherein the view availability direction indicator comprises visual information that indicates the direction towards the position in the first visual information.

19. The method of claim 18, wherein the transition animation causes changing of at least one of the first visual information or the second visual information into a shape such that the transition animation conveys separation information of at least the first geographical location and the second geographical location and a movement of the apparatus from the at least one of the first visual information or the second visual information.

\* \* \* \* \*